Patented Feb. 24, 1953

2,629,485

UNITED STATES PATENT OFFICE 2,629,485

VIBRATING CONVEYER

Joseph William Sherwen, Erith, England, assignor to The General Electric Company, Limited, London, England Application April 30, 1949, Serial No. 90,655
In Great Britain April 27, 1948

10 Claims. (Cl. 198—220)

1

This invention relates to vibrating conveyors and the like, for example of the kind comprising a deck, trough or the like which is arranged to be vibrated to cause ore, material or articles placed thereon, or at least a substantial part of the ore, material or articles, to pass along the length of the conveyor. The said deck, trough or the like may be in the form of a screen in which case part of the ore or material may fall through the screen while the rest passes along the length of the conveyor.

It has previously been proposed in vibrating conveyors of this type to mount a trough on a number of leaf springs set at an angle of say 70° to the line of the trough so that when the trough is given a reciprocating motion in the direction of its length, the trough lifts on the forward stroke carrying or throwing the material forward and upwards and the trough tends to fall back from under the material during the return stroke. It will be appreciated however that the direction in which material passes along the conveyor is determined by the angle of set of the leaf springs.

It is one object of the present invention to provide a vibrating conveyor which may be used to pass material in either direction along the conveyor.

According to the present invention, a vibrating conveyor or the like comprises in combination a deck, trough or the like, a first means adapted to impart a reciprocating motion to the said deck, trough or the like substantially in the direction of movement of ore, material or articles thereon, and a second means adapted to impart a reciprocating motion to the said deck, trough or the like to cause it to move up and down.

Preferably both the said means are electromagnetic means and, in a conveyor system, electrical means may be provided to energise the operating coils thereof through half-wave rectifiers from an alternating current supply. The electrical means may be arranged selectively to cause ore, material or articles placed on the deck, trough or the like to travel to either one end or the other of the conveyor.

Figure 1:
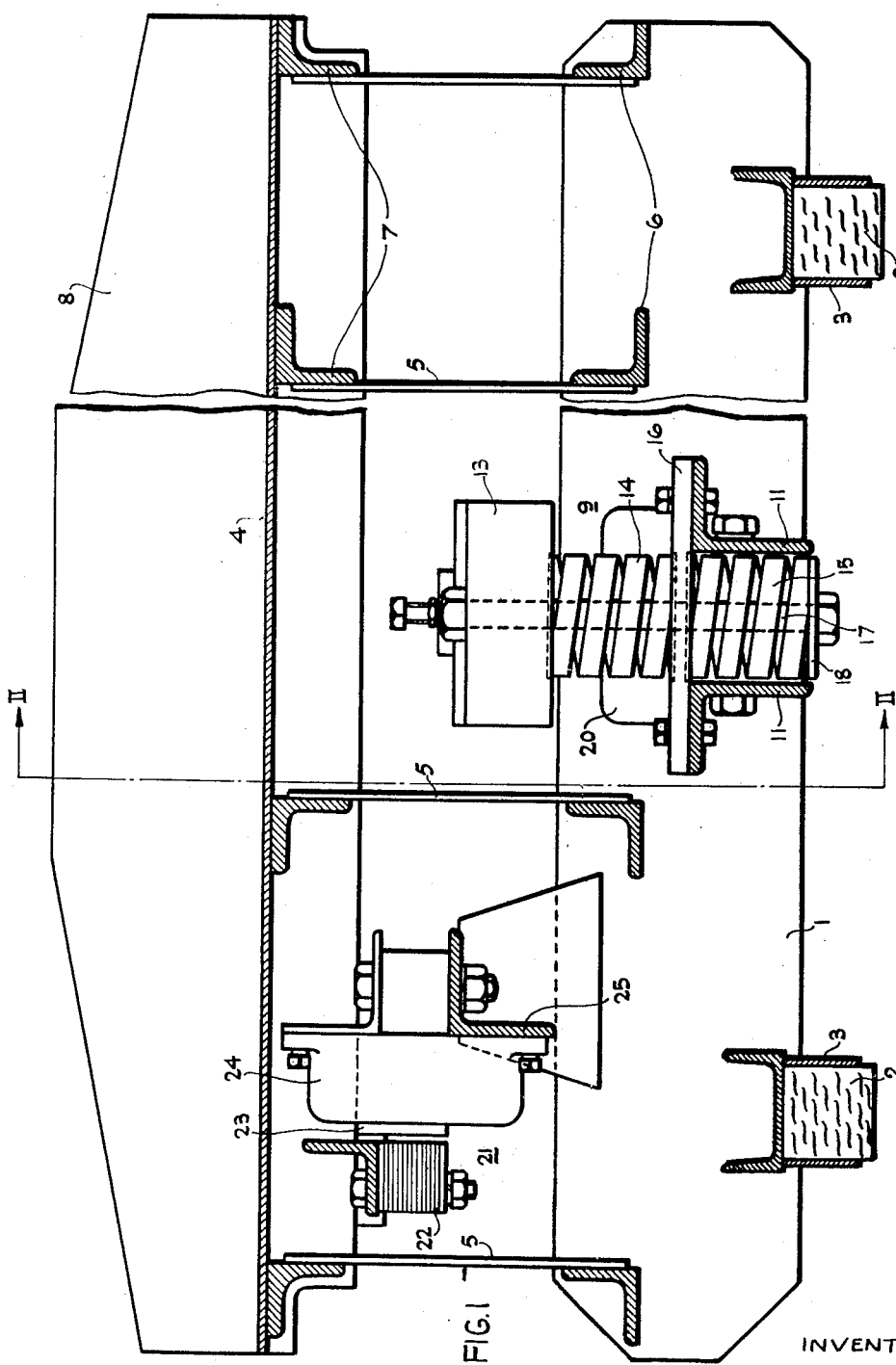
Figure 2:
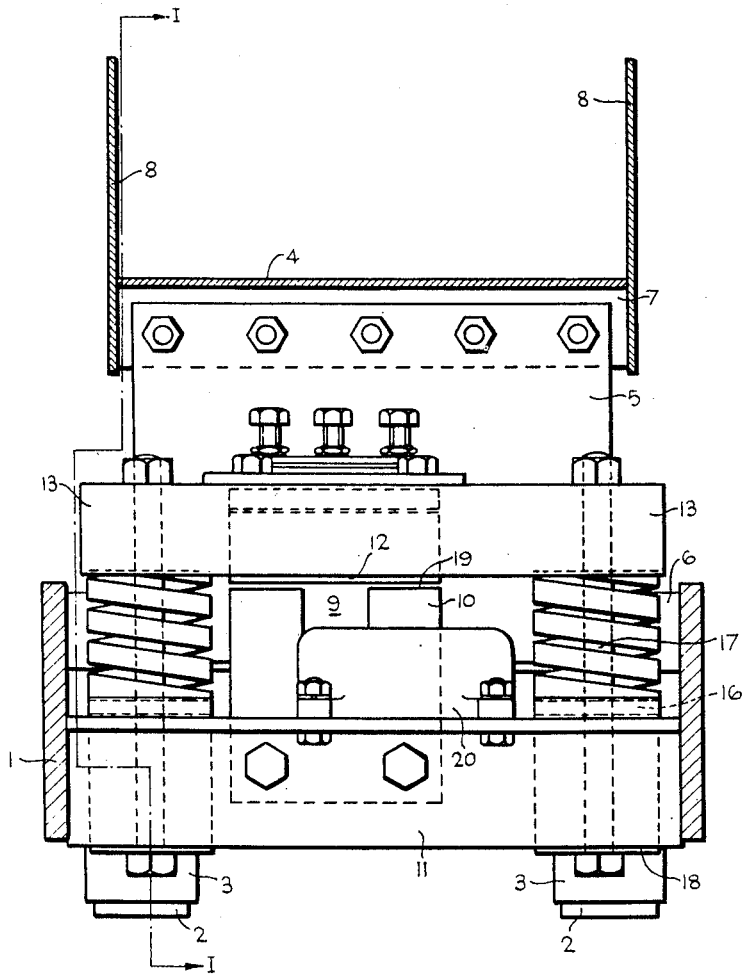
Figure 3:
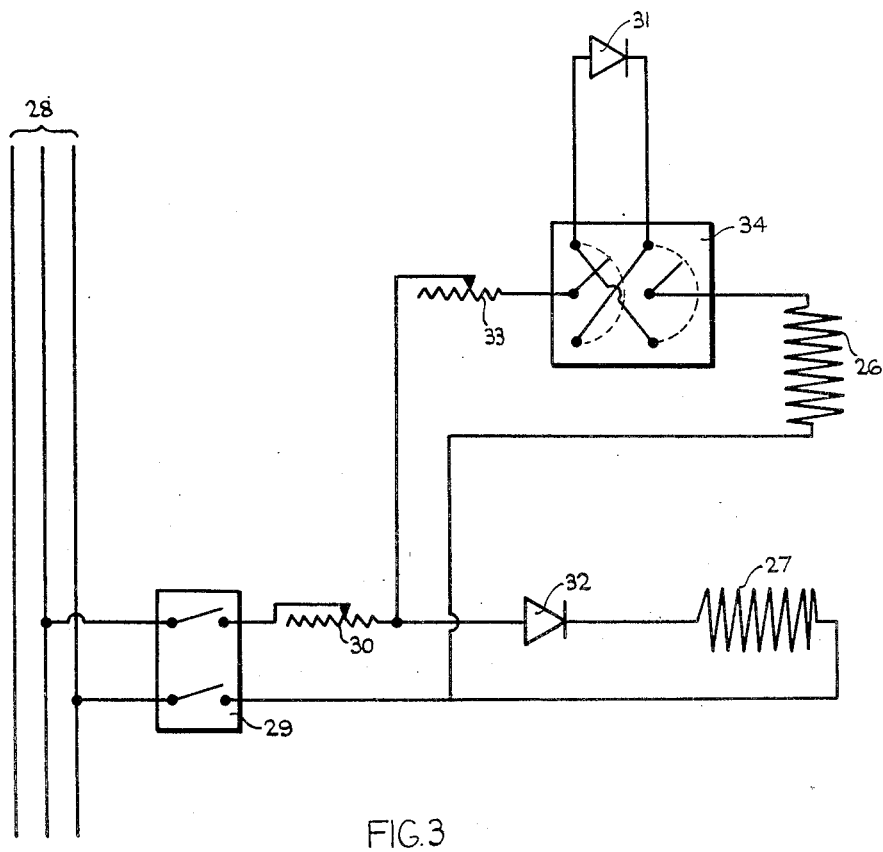
Figure 4:
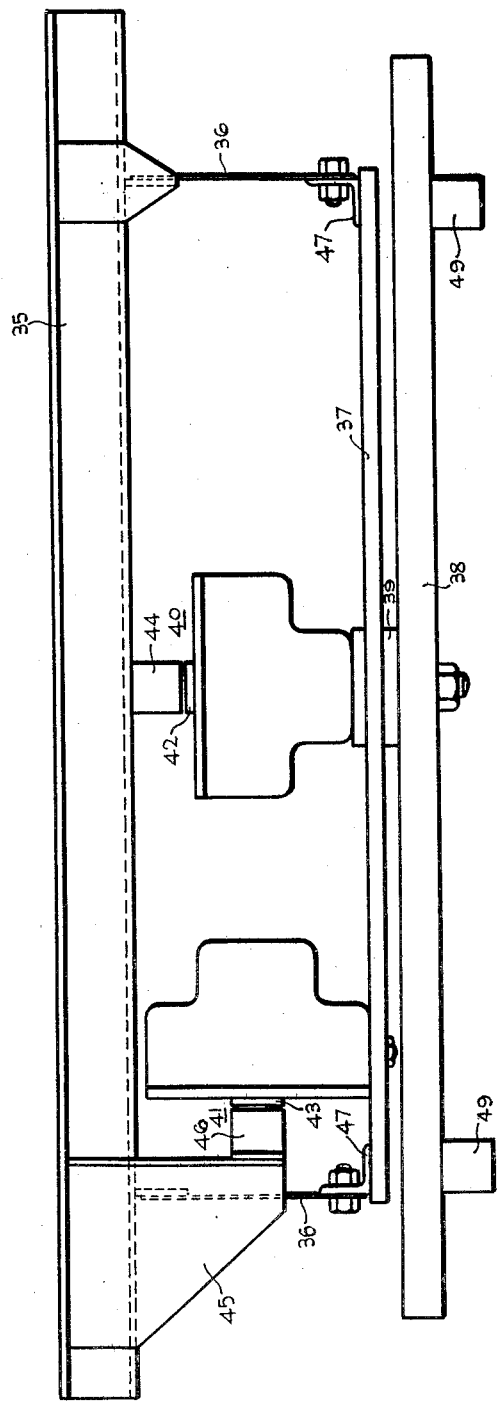
Figure 5:
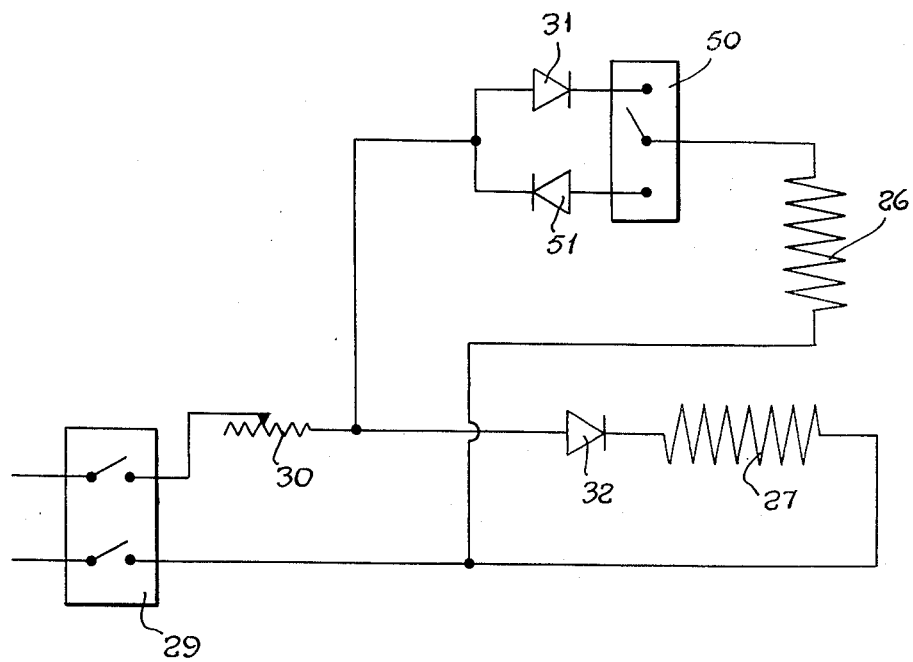

Two constructions of vibrating conveyor in accordance with the invention will now be described by way of example with reference to the four figures of the accompanying drawing in which Figures 1 and 2 show side and end elevations respectively of the first construction, Figures 1 and 2 being sections at lines I—I and II—II of Figures 2 and 1 respectively, Figure 3 shows diagrammatically the associated electric circuits, Figure 4 shows a side elevation of the second construction, and Fig. 5 is a view similar to Fig. 3 of a

2 circuit embodying a modified form of my invention.

Referring now to Figures 1 and 2 the first construction of vibrating conveyor comprises a rigid steel frame 1, which frame rests in a horizontal position on four rubber feet 2 carried in leg members 3 connected to the underside of the frame 1, supporting a conveyor deck 4 on four leaf springs 5. The leaf springs 5 are disposed vertically along the length of the conveyor deck 4 and are connected to the frame 1 and deck 4 by means of angle members 6 and 7 respectively. The conveyor deck 4 is provided with side members 8.

On the frame 1 there is also mounted an electromagnetic vibrator 9 which is arranged to impart a reciprocating motion to the frame 1 thereby causing the deck 4 to move up and down. The vibrator 9 comprises a U-shaped laminated core 10 carried on support members 11 rigidly connected to the frame and the core 10 co-operates with an armature 12 rigidly secured to a pendulous weight 13. Two pairs of helical springs 14 and 15 are provided the two springs 14 and 15 of a pair being disposed on opposite sides of a seat member 16 secured to the support members 11 and clamped, by means of a rod 17 passing through the springs 14 and 15, between the weight 13 and a washer 18. The weight 13 may thus vibrate up and down relative to the frame 1 and the core 10 and armature 12 are so arranged that there is a small air gap 19 between the core 10 and armature 12. One limb of the U-shaped core 10 carries an operating coil enclosed in a coil cover 20.

A second electromagnetic vibrator 21 is arranged to impart a reciprocating motion to the conveyor deck 4 along the length thereof. This vibrator 21 comprises a laminated armature 22 rigidly connected to the deck 4, the armature 22 co-operating with a core 23 which carries an operating coil. The said operating coil is enclosed in a coil cover 24 and the core 23 is rigidly connected through a bracket member 25 to the frame 1. The springs 5 are so selected that the natural frequency of vibration of the deck 4 along its length is close, but preferably not equal, to the frequency of the impulses it will receive from the electromagnetic vibrator 21. Thus, if the vibrator 21 is arranged as hereinafter described to be energised from a 50 C. P. S. alternating current supply, the natural frequency of the deck 4 might be 52 C. P. S.

Referring now to Figure 3 the operating coils 26 and 27 of the electromagnetic vibrators 9 and 21 respectively are energised from a source of alternating current 28 through a two-pole starting switch 29 and a main control resistance 30. The operating coils 26 and 27 are arranged to be fed through first and second half-wave rectifiers 31 and 32 respectively and both rectifiers 31 and 32 may be of the metal rectifier type. A further control resistance 32 is connected in series with the operating coil 26 of the vibrator 9 in order to provide independent control of the magnitude of vertical movement of the conveyor deck 4.

It will be appreciated that the operating coils 26 and 27 of the two vibrators 9 and 21 are each energised during one half cycle of the alternating current supply, and thus the horizontal and vertical components of motion imparted to the conveyor deck 4 are in a fixed relationship to one another and ore or material placed on the deck will be joggled to one end or the other depending on whether the two coils 26 and 27 are energised during the same or alternate half cycles. In order to reverse the direction in which the ore or material will travel along the deck 4, a two-pole change-over switch 34 is associated with one of the rectifiers 31 or 32, for example the rectifier 31 associated with the electromagnetic vibrator 9 may be connected as shown in Figure 3 to permit current to flow in either direction through the coil 26 in dependence upon the position of the switch 34.

In an alternative method, shown in Fig. 5, of controlling the energisation of the operating coils 26 and 27 of the two electromagnetic vibrators 9 and 21, the coil 26 of the vibrator 9 adapted to impart vertical movement to the conveyor deck is connected through a single-pole change-over switch 50 in series with either one of two rectifiers 31 or 51. The two rectifiers 31 or 51 are connected in opposite sense so that whether the operating coils 26 and 27 of the two vibrators are energised during the same or alternate half cycles is dependent upon the position of the said change-over switch 50.

The second construction of reversible conveyor in accordance with the present invention is a modification of the first construction previously described and, referring now to Figure 4, comprises a trough 35 supported in a horizontal position by two leaf springs 36 disposed one towards each end of the trough 35. The lower ends of the two springs 36 are secured through angle brackets 47 to an elongated spring supporting plate 37 and the supporting plate 37 is spaced from a base plate 38 by a packing plate 39 disposed mid-way along the length of the supporting plate 37 so that the ends thereof, which carry the leaf springs 36 may flex slightly up and down. The base plate 38 is mounted on rubber feet 49.

Two electromagnetic vibrators 40 and 41 are provided to impart vertical and longitudinal movement respectively to the trough 35. The electromagnetic vibrator 40 comprises an armature 44 and a U-shaped core 42, the armature 44 being rigidly secured to the trough 35 midway along its length and the core 42 located over the packing plate 39 and bolted to the base plate 38. The core 43 of the vibrator 41 is carried on the supporting plate 37 and the co-operating armature 46 is secured to a supporting plate 45 which is fixed to the trough 35. The operating coils (not shown) of the two vibrators 40 and 41 are arranged to be energised through half-wave rectifiers in exactly the same manner as has been previously described in connection with the first construction of conveyor and is shown in Figure 3 or Figure 5.

It will be appreciated that in this construction of conveyor, since the vibrator 40 acts directly on the trough 35 to impart to it the required vertical motion, it is not necessary to provide the more massive frame or pendulous weight which were essential in the first construction of conveyor described with reference to Figures 1 and 2 of the drawings.

It is not essential for the deck or trough of a conveyor as described above to lie horizontal when in operation and it may be inclined at a small angle to the horizontal so that ore or material thereon is caused to travel up-hill. Moreover, if it is desired to extend the total length of a conveyor system, two or more conveyors may be arranged in line with a flexible coupling between their decks or troughs.

It will be appreciated that this construction of apparatus comprising a vibrating deck or trough is not restricted to conveyors and may be applied to sifting, concentrating, moulding and similar apparatus.

I claim:

1. A vibrating conveyor comprising in combination a support for the material to be conveyed, a first electro-magnetic vibrator arranged to impart a reciprocatory motion to said support generally parallel to a desired direction of movement of the material, a second electromagnetic vibrator arranged to impart a reciprocatory motion to said support to cause it to move up and down, and electrical means for energising the operating windings of the two electro-magnetic vibrators to cause them to vibrate selectively in phase and in anti-phase.

2. A vibrating conveyor comprising in combination a support for the material to be conveyed, a first electro-magnetic vibrator arranged to impart a reciprocatory motion to said support generally parallel to a desired direction of movement of the material, a second electro-magnetic vibrator arranged to impart a reciprocatory motion to said support to cause it to move up and down, two half wave rectifiers to be fed from a common single-phase alternating current supply, each rectifier being arranged to energise the operating windings of one of said electromagnetic vibrators, and switch means for reversing the connections of one of said rectifiers to the alternating current supply to permit reversal of the conveyor by changing the relative timing of the reciprocations produced by the electro-magnetic vibrators.

3. A vibrating conveyor comprising in combination a support for the material to be conveyed, a first electro-magnetic vibrator arranged to impart a reciprocatory motion to said support generally parallel to a desired direction of movement of the material, a second electro-magnetic vibrator arranged to impart a reciprocatory motion to said support to cause it to move up and down, and electrical means for energising the operating windings of the two electro-magnetic vibrators comprising two half wave rectifiers associated with one of said electro-magnetic vibrators, switch means for selectively connecting one of said rectifiers to a single-phase alternating current supply, one of said rectifiers being connected for energisation of the electro-magnetic vibrator during one half cycle of the mounting current supply while the other rectifier is connected for energisation of said electro-magnetic vibrator during the other half cycle of said alternating current supply, a further half wave rectifier arranged to be fed from said single-phase alternating current supply to energise said second electro-magnetic vibrator, and switch means for connecting said first and second rectifiers to said supply selectively to reverse the direction of travel of the material along the conveyor.

4. A vibrating conveyor comprising in combination a support for the material to be conveyed, a mounting for said support comprising leaf springs extending perpendicular to said support and each secured at one end to said support and at the other end to a rigid frame, resilient mounting means for said frame, a first electro-magnetic vibrator arranged to impart a reciprocatory motion to said support generally parallel to a desired direction of motion of the material by causing flexure of said leaf springs, a second electro-magnetic vibrator having one part rigidly secured to said frame and another part rigidly secured to a pendulous weight resiliently mounted on said frame, said second electro-magnetic vibrator being arranged to impart a reciprocatory motion to said support to cause it to move up and down, and electrical means for energising the operating windings of the two electro-magnetic vibrators comprising two half wave rectifiers associated with one of said electro-magnetic vibrators, switch means for selectively connecting one of said rectifiers to a single-phase alternating current supply, one of said rectifiers being connected for energisation of the electro-magnetic vibrator during one half cycle of the mounting current supply while the other rectifier is connected for energisation of said electro-magnetic vibrator during the other half cycle of said alternating current supply, a further half wave rectifier arranged to be fed from said single-phase alternating current supply to energise said second electro-magnetic vibrator, and switch means for connecting said first and second rectifiers to said supply selectively to reverse the direction of travel of the material along the conveyor.

5. A vibrating conveyor comprising in combination a support for the material to be conveyed, a mounting for said support comprising leaf springs extending perpendicular to said support, said springs each being secured at one end to said support and at the other end being resiliently mounted on a rigid base, a first electro-magnetic vibrator arranged to impart a reciprocatory motion to said support generally parallel to a desired direction of movement of the material by flexure of the leaf springs, a second electro-magnetic vibrator having one part rigidly secured to said base and a second part rigidly connected to the support arranged to impart a reciprocatory motion to said support to cause it to move up and down on said resilient mounting of the leaf springs, and electrical means for energising the operating windings of the two electro-magnetic vibrators comprising two half wave rectifiers associated with one of said electro-magnetic vibrators, switch means for selectively connecting one of said rectifiers to a single-phase alternating current supply, one of said rectifiers being connected for energisation of the electro-magnetic vibrator during one half cycle of the mounting current supply while the other rectifier is connected for energisation of said electro-magnetic vibrator during the other half cycle of said alternating current supply, a further half wave rectifier arranged to be fed from said single-phase alternating current supply to energise said second electro-magnetic vibrator, and switch means for connecting said first and second rectifiers to said supply selectively to reverse the direction of travel of the material along the conveyor.

6. A vibrating conveyor comprising in combination a support for the material to be conveyed, a first electro-magnetic vibrator arranged to impart substantially linear reciprocatory motion to said support generally parallel to a desired direction of movement of the material, a second electro-magnetic vibrator arranged to impart substantially linear reciprocatory motion to said support to cause it to move up and down, and switch means to alter the electrical connections to one of the electro-magnetic vibrators to change the relative timing of the reciprocations produced by said first and second electro-magnetic vibrators, thereby to select a desired direction of movement of the material along the support.

7. A vibrating conveyor comprising in combination a support for the material to be conveyed, a mounting for said support comprising leaf springs extending perpendicular to said support and arranged to flex to permit substantially linear reciprocatory motion of the support generally parallel to a desired direction of movement of the material, a first electro-magnetic vibrator arranged to impart such reciprocatory motion to said suppot in said desired direction of movement of the material, a second electro-magnetic vibrator arranged to impart substantially linear reciprocatory motion to said support to cause it to move up and down and switch means to alter the electrical connections to one of the electro-magnetic vibrators to change the relative timing of the reciprocations produced by said first and second electro-magnetic vibrators, thereby to select a desired direction of movement of the material along the support.

8. A vibrating conveyor comprising in combination a support for the material to be conveyed, a mounting for said support comprising leaf-springs extending perpendicular to said support and each secured at one end to said support and at the other end to a rigid frame, resilient mounting means for said frame, a first electro-magnetic vibrator arranged to impart substantially linear reciprocatory motion to said support generally parallel to a desired direction of movement of the material by causing flexure of said leaf-springs, a second electro-magnetic vibrator having one part rigidly secured to said frame and another part rigidly secured to a pendulous weight resiliently mounted on said frame, said second electro-magnetic vibrator being arranged to impart substantially linear reciprocatory motion to said support to cause it to move up and down, and switch means to alter the electrical connections to one of the electro-mechanical vibrators to change the relative timing of the reciprocations produced by said first and second electro-magnetic vibrators, thereby to select a desired direction of movement of the material along the support.

9. A vibrating conveyor comprising in combination a support for the material to be conveyed, a mounting for said support comprising leaf-springs extending perpendicular to said support, said springs each being secured at one end to said support and at the other end being resiliently mounted on a rigid base, a first electro-magnetic vibrator arranged to impart substantially linear reciprocatory motion to said support generally parallel to a desired direction of movement of the material by flexure of the leaf-springs, a second electro-magnetic vibrator having one part rigidly secured to said base and a second part rigidly connected to the support arranged to impart substantially linear reciprocatory motion to said support to cause it to move up and down on said resilient mounting of the leaf-springs, and switch means for altering the electrical connections to one of the electro-mechanical vibrators to change the relative timing of the reciprocations produced by said first and second electro-magnetic vibrators, thereby to select a desired direction of movement of the material along the support.

10. A vibrating conveyor comprising in combination a support for the material to be conveyed, a first electro-magnetic vibrator having an operating winding and arranged to impart a reciprocatory motion to said support generally parallel to a desired direction of movement of the material, a second electro-magnetic vibrator having an operating winding and arranged to impart a reciprocatory motion to said support to cause it to move up and down, two half wave rectifiers to be fed from a common single-phase alternating current supply, connections from each rectifier to the operating winding of one of said electro-magnetic vibrators, and switch means for reversing the connections between one of the rectifiers and its associated operating winding.

JOSEPH WILLIAM SHERWEN.

REFERENCES CITED

The following references are of record in the file of this patent:

UNITED STATES PATENTS

| Number | Name | Date |
| --- | --- | --- |
| 1,157,543 | Jobke | Oct. 19, 1915 |
| 1,672,807 | Etzel | June 5, 1928 |
| 2,076,195 | Fickel | Apr. 6, 1937 |
| 2,094,787 | Flint | Oct. 5, 1937 |
| 2,333,338 | Rapp | Nov. 2, 1943 |
| 2,374,663 | Carrier | May 1, 1945 |